United States Patent Office 3,385,895
Patented May 28, 1968

3,385,895
PREPARATION OF SUBSTITUTED ALPHA-INDANONES FROM HALOGENATED ALIPHATIC ETHERS
Herman A. Bruson, Woodbridge, and Howard L. Plant, Milford, Conn., assignors to Olin Mathieson Chemical Corporation, a corporation of Virginia
No Drawing. Filed Apr. 1, 1966, Ser. No. 539,284
8 Claims. (Cl. 260—590)

ABSTRACT OF THE DISCLOSURE

The process for preparing beta-disubstituted alpha-indanones by reacting carbon monoxide, a benzene-type aromatic compound and a halogenated aliphatic ether in the presence of an aluminum halide selected from the group consisting of aluminum chloride and aluminum bromide.

---

This invention relates to a process for preparing beta-disubstituted alpha-indanones.

In the past, such compounds have been prepared by reacting various arylpropionic acids or the corresponding acid chlorides with acidic condensing agents such as hydrogen fluoride, aluminum chloride or phosphoric anhydride to effect a ring closure. Usually the products have been costly because of the numerous steps involved in preparing the required $\alpha,\alpha$-disubstituted arylpropionic acids (or the corresponding acid chlorides).

For example 2-methyl-2-phenylindanone-1, a valuable intermediate for new drugs, was obtained by a costly method in a series of five steps, by Neil Campbell and Englebart Ciganek, Jour. Chem. Soc. (London), 1956, 3834–3836.

There is a substantial need for a more direct, more economical procedure for preparing beta-disubstituted alpha-indanones.

It is a primary object of this invention to overcome the disadvantages inherent in previously known techniques for preparing beta-disubstituted alpha-indanones.

Another object of the invention is to provide an improved process for preparing beta-disubstituted alpha-indanones.

Still another object of the invention is to provide an improved process for preparing 2-methyl-2-phenylindanone-1.

A further object of the invention is to provide an improved process for preparing 2,2-dimethylindanone.

It is another object of the invention to provide an improved process for preparing 2,2,3,3-tetramethylindanone.

These and other objects of the invention will be apparent from the following detailed description thereof.

It has now been discovered that the foregoing objects are accomplished when certain beta,beta'-dihalogenoaliphatic ethers, which are described more fully hereinafter, are reacted with carbon monoxide and an aromatic compound in the presence of an aluminum halide selected from the group consisting of aluminum chloride and aluminum bromide.

More in detail, beta,beta'-dihalogenoaliphatic ethers suitable for use in preparing beta-disubstituted alpha-indanones in accordance with the novel process of this invention have the formula

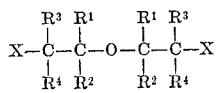

wherein

X is a halogen selected from the group consisting of chlorine and bromine;
$R^1$, $R^2$, $R^3$ and $R^4$ are substituents selected from the group consisting of hydrogen and lower alkyl containing between 1 and about 4 carbon atoms;
  at least one $R^1$ and at least one $R^3$ substituent each being a lower alkyl containing between 1 and about 4 carbon atoms; and
  the halogenated aliphatic ether contains a total number of carbon atoms in the range between about 6 and about 12.

Typical ethers of the above formula which can be used in carrying out the process of this invention are, for example, the following:

(a) $ClCH_2CH(CH_3)$—O—$CH(CH_3)CH_2Cl$
(b) $ClCH(CH_3)CH_2$—O—$CH_2CH(CH_3)Cl$
(c) $ClCH_2CH(CH_3)$—O—$CH_2CH(CH_3)Cl$
(d) $ClCH_2CH(CH_3)_2$—O—$C(CH_3)_2CH_2Cl$
(e) $ClCH_2CH(C_2H_5)$—O—$CH(C_2H_5)CH_2Cl$
(f) $ClCH(C_2H_5)CH_2$—O—$CH_2$—$CH(C_2H_5)Cl$
(g) $ClCH(C_2H_5)CH_2$—O—$CH(C_2H_5)CH_2Cl$
(h) $ClCH(CH_3)CH(CH_3)$—O—$CH(CH_3)CH(CH_3)Cl$
(i) $ClC(CH_3)_2C(CH_3)_2$—O—$C(CH_3)_2C(CH_3)_2Cl$
(j) $ClCH_2(CH_3)_3CCH$—O—$CHC(CH_3)_3CH_2Cl$
(k) $Cl(CH_3)_3CCHCH_2$—O—$CH_2CHC(CH_3)_3Cl$

The corresponding bromine-substituted ethers also illustrate ethers suitable for the process of this invention. These chlorinated ethers are obtained as by-products in the reaction of hypochlorous acid with olefines having from 3 to 6 carbon atoms such as propylene, the various butylenes, amylenes and hexylenes.

The reaction of the halogenated aliphatic ether with carbon monoxide and the aromatic compound is carried out in the presence of an aluminum halide selected from the group consisting of aluminum chloride, aluminum bromide and mixtures thereof. The commercially available "anhydrous" material, or these compounds containing small quantities (up to about three percent by weight) of water may be employed. The proportion of aluminum halide is generally in the range between about 1 and about 3 moles per mole of the halogenated aliphatic ether, but greater or lesser proportions may be employed if desired. The preferred proportion is in the range between about 1.5 and about 2.5 moles of aluminum halide per mole of the halogenated aliphatic ether.

The proportion of carbon monoxide employed in carrying out the process of this invention is generally equivalent to between about 1 and about 5, and preferably between about 1 and about 3 moles per mole of halogenated aliphatic ether employed as a reactant.

The reaction is carried out in the presence of an aromatic compound having two reactive hydrogen atoms positioned on the aromatic ring which are ortho to each other and available for Friedel-Crafts alkylation and acylation. Suitable aromatic compounds include benzene, halogenated benzenes such as monochlorobenzene, monobromobenzene and monofluorobenzene, alkyl-substituted benzenes such as toluene, o-, m-, or paraxylene, cumene, pseudo-cumene, cymene tertiary butylbenzene, ethyl-benzene, diethylbenzene, cycloalkyl-substituted benzenes such as cyclohexylbenzene and mixtures thereof. Other aromatic compounds such as anisole, phenetol, diphenyl ether, diphenylmethane, diphenyl ethane, diphenyl, naphthalene, anthracene, fluorene, phenanthrene are also capable of producing indanones but separation is difficult because of the other reaction products including resins, aldehydes and tar-like materials. The proportion of aromatic compound is generally equivalent to at least one mole of the aromatic compound per atom of halogen in the halogenated aliphatic ether, but is preferably between 4 and about 8 times the stoichiometric proportion.

The process of this invention is generally carried out at a temperature in the range of about 0° C. and about 80° C., and preferably between about 15° C. and about 30° C. Atmospheric pressure is generally suitable for effecting the reaction, but super-atmospheric pressures or sub-atmospheric pressures may be employed if desired.

Inert organic solvents such as carbon disulfide may be employed if desired, and are particularly useful when the reaction mixture is highly viscous.

In one embodiment of the invention the aluminum halide is suspended in the aromatic compound, with or without the inert solvent, as the case may be, and a rapid stream of carbon monoxide is passed through the stirred suspension, while simultaneously gradually adding the halogenated aliphatic ether to the suspension. The rate of addition of carbon monoxide is generally equivalent to approximately the rate of liberation of hydrogen halide.

If desired, however, the halogenated aliphatic ether may be first added to a suspension of the aluminum halide in the aromatic compound or inert solvent, and the resulting aluminum halide complex is then reacted with carbon monoxide to effect a ring closure. Generally the yield of alpha-indanones is lower when employing the latter embodiment than that obtained by the simultaneous addition of carbon monoxide and halogenated aliphatic ether to the suspension of aluminum halide and the aromatic compound.

The reaction of benzene with ethers $(a)$, $(b)$, or $(c)$ above and carbon monoxide in accordance with this invention gives 2-methyl-2-phenylindanone; as illustrated in the following equation:

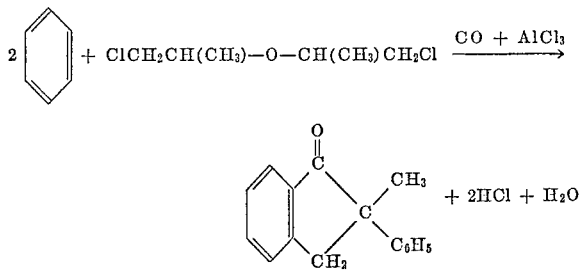

In the same manner, ethers $(d)$, $(e)$, $(f)$, $(g)$ or $(h)$ react with benzene and CO to give 2,2-dimethylindanone. Similarly ethers $(i)$, $(j)$ and $(k)$ react with benzene, CO, and $AlCl_3$ to give 2,2,3,3-tetramethylindanone.

By using toluene, xylene, ethyl benzene, cumene, etc. in place of benzene, nuclear alkyl derivatives of these indanones are formed.

The following examples illustrate this invention, without any intention of being limited thereby. All parts and percentages are by weight unless otherwise specified.

Example 1

Beta,beta'-dichloroisopropyl ether [a mixture of ethers $(a)$, $(b)$, $(c)$; $n_D^{24}=1.4458$] (38 g.; 0.22 mole) was added dropwise over a period of 2½ hours to a vigorously stirred suspension of $AlCl_3$ (95 g.; 0.7 mole) in 206 g. (2.65 moles) of benzene contained in a creased Morton-type flask, while a rapid stream of carbon monoxide was bubbled continuously through the mixture. The reaction temperature was maintained at 22–24° C. by means of a water bath. Hydrogen chloride and excess carbon monoxide was allowed to excape freely from the exit condenser attached to the flask. The product was poured onto 600 g. of crushed ice, and the washed benzene layer, dried and distilled at reduced pressure. At 125–170° C./0.4 mm. crude oily solid (22.9 g.) distilled over. This material was treated with a small amount of petroleum ether and filtered to yield 9 g. of 2-methyl-2-phenylindanone, M.P. 109–110° C. after one recrystallization from 50 ml. of methanol.

Example 2

One mole equivalent of any of the isomeric beta,beta'-dichloro-butyl ethers $(d)$, $(e)$, $(f)$, $(g)$ or $(h)$ or a mixture thereof, as obtained in the commercial hydrochlorination of butylene-1, butylene-2, and isobutylene, is added dropwise to a stirred suspension of two mole equivalents $AlCl_3$ or $AlBr_3$ in eight mole equivalents of benzene at 20–25° C. while carbon monoxide in excess is rapidly bubbled through the reaction mixture as described in Example 1. After evolution of hydrogen chloride ceased, the reaction mixture was decomposed with ice water, the benzene layer separated, washed, dried and distilled, first at atmospheric pressure to remove low boilers and finally in vacuo yield 2,2-dimethylindanone which after recrystallization at −40° C. from low boiling petroleum ether melted at 42–43° C.

Example 3

In the same manner as above, beta,beta'-dichlorohexyl ethers $(i)$, $(j)$ and $(k)$ or a mixture thereof as obtained in the hypochlorination of tetramethyl ethylene or neohexene, reacts with benzene, CO and $AlCl_3$ or $AlBr_3$ to give 2,2,3,3-tetramethylindanone as a colorless liquid B.P. 114–115° C./6 mm., $n_D^{20}=1.5356$.

Various modifications of the invention, some of which have been referred to above, can be made without departing from the spirit of the invention. What is desired to be secured by Letters Patent is:

1. The process for preparing beta-disubstituted alpha-indanones which comprises reacting carbon monoxide, an aromatic compound selected from the group consisting of benzene, halogenated benzenes, alkyl-substituted benzenes and mixtures thereof, said aromatic compound having two reactive hydrogens positioned ortho to each other available for Friedel-Crafts alkylation and acylation, and a halogenated aliphatic ether in the presence of an aluminum halide selected from the group consisting of aluminum chloride and aluminum bromide, wherein said halogenated aliphatic ether has the formula:

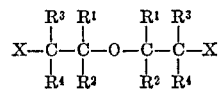

wherein
X is a halogen selected from the group consisting of chlorine and bromine;
$R^1$, $R^2$, $R^3$ and $R^4$ are substituents selected from the group consisting of hydrogen and lower alkyl containing between 1 and about 4 carbon atoms;
at least one $R^1$ and at least one $R^3$ substituent each being a lower alkyl containing between 1 and about 4 carbon atoms; and
the halogenated aliphatic ether contains a total number of carbon atoms in the range between about 6 and about 12, and recovering the beta-disubstituted alpha-indanone produced thereby.

2. The process of claim 1 wherein said aromatic compound is benzene.

3. The process of claim 1 wherein said halogenated aliphatic ether is beta,beta'-dichlorodiisopropyl ether.

4. The process of claim 1 wherein said halogenated aliphatic ether is beta,beta'-dichlorodiisobutyl ether.

5. The process of claim 1 wherein said aluminum halide is aluminum chloride.

6. The process for preparing 2-methyl-2-phenylindanone which comprises reacting carbon monoxide with benzene and beta,beta'-dichlorodiisopropyl ether in the presence of anhydrous aluminum chloride.

7. The process for preparing 2,2-dimethylindanone which comprises reacting carbon monoxide with benzene and beta,beta'-dichlorohexyl ether in the presence of anhydrous aluminum chloride.

8. The process for preparing 2,2,3,3-tetramethylindanone which comprises reacting carbon monoxide with benzene and beta,beta'-dichlorodiisohexyl ether in the presence of anhydrous aluminum chloride.

References Cited

UNITED STATES PATENTS 2,570,793  10/1951  Gresham et al.

DANIEL D. HORWITZ, *Primary Examiner.*